(12) United States Patent
Farrington et al.

(10) Patent No.: US 10,903,508 B2
(45) Date of Patent: Jan. 26, 2021

(54) FUEL CELL ASSEMBLIES AND PREPARATION METHODS THERFOR

(71) Applicants: Daimler AG, Stuttgart (DE); Ford Motor Company, Dearborn, MI (US); Nissan Motor Co., Ltd., Yokohama (JP)

(72) Inventors: Simon Farrington, Vancouver (CA); Charles Lee, Vancouver (CA); Alvin Lee, Vancouver (CA)

(73) Assignees: Daimler AG, Stuttgart (DE); Ford Motor Company, Dearborn, MI (US); Nissan Motor Co., LTD., Yokohama (JP)

(*) Notice: Subject to any disclaimer, the term of this patent is extended or adjusted under 35 U.S.C. 154(b) by 366 days.

(21) Appl. No.: 14/759,695

(22) PCT Filed: Dec. 20, 2013

(86) PCT No.: PCT/IB2013/002845
§ 371 (c)(1),
(2) Date: Jul. 8, 2015

(87) PCT Pub. No.: WO2014/111745
PCT Pub. Date: Jul. 24, 2014

(65) Prior Publication Data
US 2015/0357656 A1    Dec. 10, 2015

Related U.S. Application Data

(60) Provisional application No. 61/754,513, filed on Jan. 18, 2013.

(51) Int. Cl.
*H01M 8/0273* (2016.01)
*H01M 8/1004* (2016.01)
(Continued)

(52) U.S. Cl.
CPC ....... *H01M 8/0273* (2013.01); *H01M 8/1004* (2013.01); *H01M 8/1007* (2016.02);
(Continued)

(58) Field of Classification Search
None
See application file for complete search history.

(56) References Cited

U.S. PATENT DOCUMENTS 4,604,332 A * 8/1986 Warszawski ........ H01M 8/0273
429/457
2006/0159978 A1 7/2006 Song et al.
(Continued)

FOREIGN PATENT DOCUMENTS

EP        2698250 A1    2/2014
JP     2006210234 A    8/2006
(Continued)

OTHER PUBLICATIONS

English language translation of Japanese Office Action dated May 24, 2016, in Japanese Application No. 2015-553176.
(Continued)

*Primary Examiner* — Alix E Eggerding
(74) *Attorney, Agent, or Firm* — Patent Central LLC; Stephan A. Pendorf

(57) ABSTRACT

A fuel cell assembly for a solid polymer electrolyte fuel cell stack may employ a construction in which a plastic film frame is used to frame a catalyst coated membrane within. In one advantageous embodiment, the plastic film frame is adhesive coated on one side and laminated at its inner edge to one surface of the catalyst coated membrane and at its outer edge to the flow field plate on the opposite side. In another advantageous embodiment, the plastic film frame is laminated to sealing features incorporated in a transition region in the flow field plate.

15 Claims, 4 Drawing Sheets

(51) Int. Cl.
*H01M 8/1018* (2016.01)
*H01M 8/2465* (2016.01)
*H01M 8/242* (2016.01)
*H01M 8/1007* (2016.01)

(52) U.S. Cl.
CPC ......... *H01M 8/1018* (2013.01); *H01M 8/242* (2013.01); *H01M 8/2465* (2013.01); *H01M 2008/1095* (2013.01); *H01M 2300/0082* (2013.01); *Y10T 156/10* (2015.01)

(56) References Cited

U.S. PATENT DOCUMENTS

| | | | |
|---|---|---|---|
| 2010/0047649 A1* | 2/2010 | Yamada | H01M 8/0273 429/481 |
| 2010/0227246 A1* | 9/2010 | Iizuka | H01M 8/0228 429/479 |
| 2012/0122013 A1* | 5/2012 | Schmidt | C08J 5/2256 429/481 |
| 2012/0251918 A1* | 10/2012 | Morimoto | H01M 8/0254 429/482 |
| 2013/0157175 A1* | 6/2013 | Sohma | H01M 8/10 429/535 |
| 2013/0183605 A1* | 7/2013 | Tanaka | H01M 8/0273 429/481 |
| 2014/0127608 A1 | 5/2014 | Sakamoto et al. | |

FOREIGN PATENT DOCUMENTS

| | | | |
|---|---|---|---|
| JP | 2007066766 A | | 3/2007 |
| JP | 2010-080437 | * | 4/2010 |
| JP | 2010080437 A | | 4/2010 |
| WO | 2012141167 A1 | | 10/2012 |

OTHER PUBLICATIONS

Written Opinion and International Search Report in International Application No. PCT/IB2013/002845 dated Jul. 15, 2014.

* cited by examiner

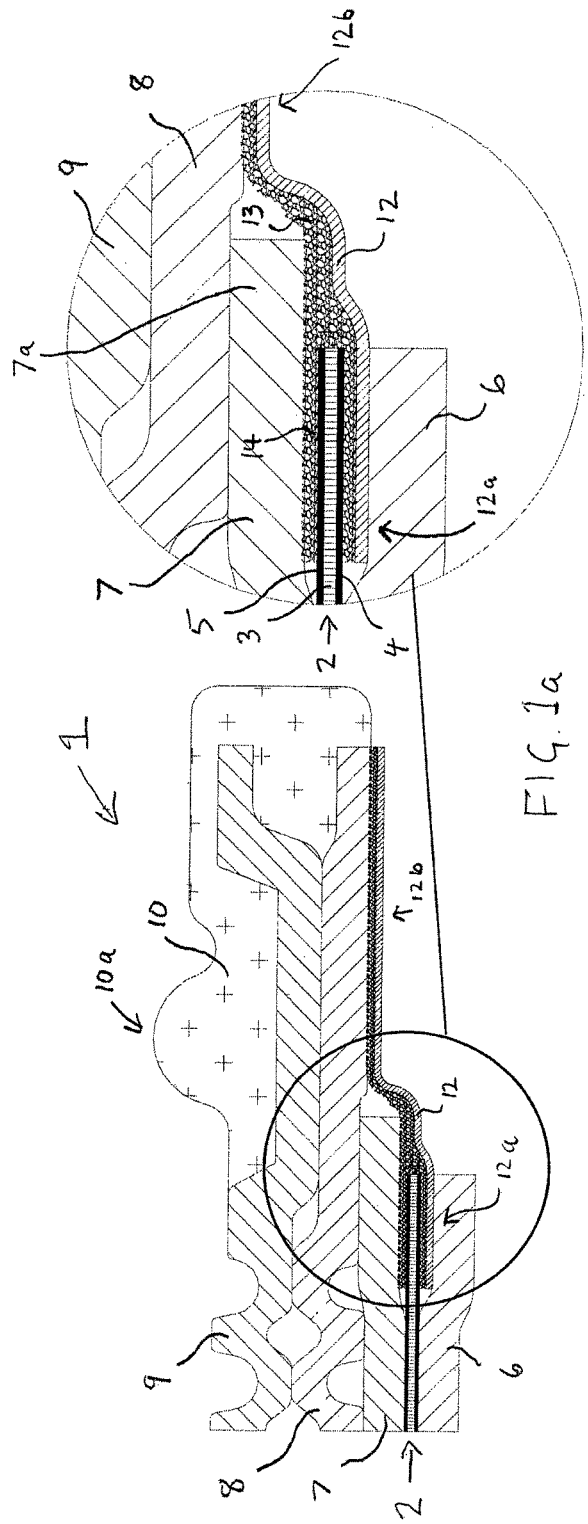
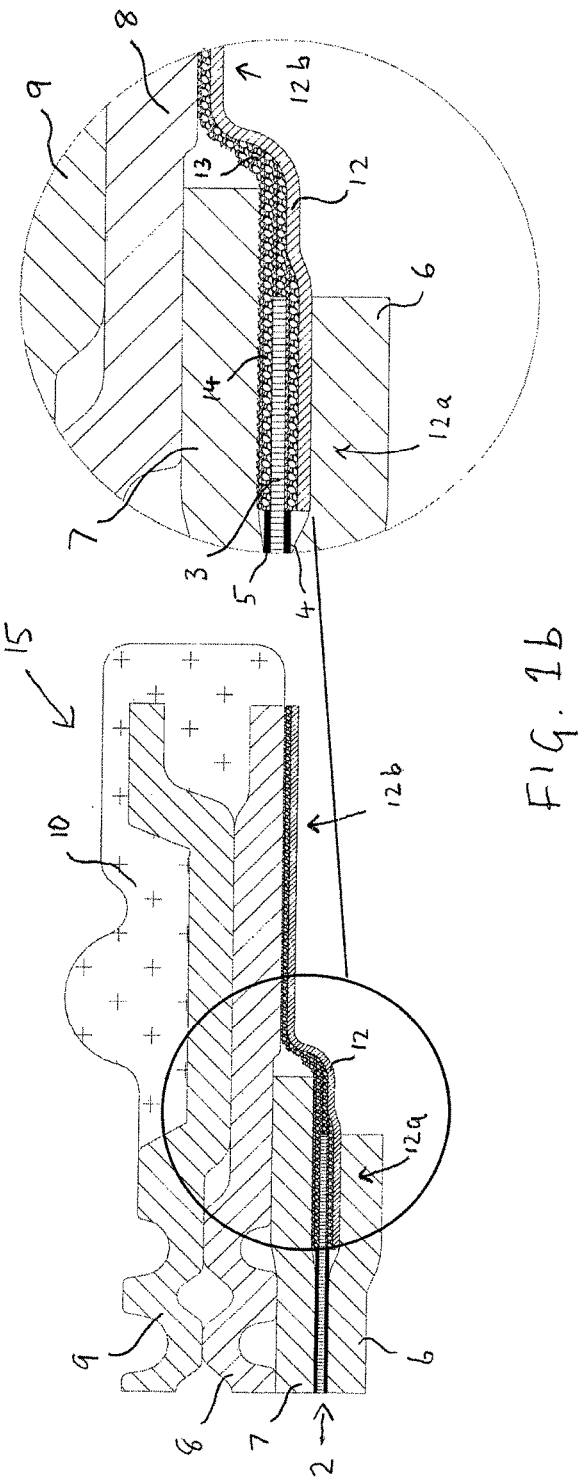

FUEL CELL ASSEMBLIES AND PREPARATION METHODS THERFOR

BACKGROUND

Field of the Invention

This invention relates to designs and methods for manufacturing fuel cell assemblies for solid polymer electrolyte fuel cell stacks. In particular, it relates to frame designs for framing catalyst coated membranes and for providing appropriate sealing.

Description of the Related Art

Fuel cells such as solid polymer electrolyte fuel cells electrochemically convert fuel and oxidant reactants, (e.g. hydrogen and oxygen or air respectively), to generate electric power. Solid polymer electrolyte fuel cells generally employ a proton conducting polymer membrane electrolyte between cathode and anode electrodes. The electrodes contain appropriate catalysts and typically also comprise conductive particles, binder, and material to modify wettability. A structure comprising a proton conducting polymer membrane sandwiched between two electrodes is known as a membrane electrode assembly. Such assemblies can be prepared in an efficient manner by appropriately coating catalyst mixtures onto the polymer membrane, and thus are commonly known as catalyst coated membranes (CCMs).

Usually, anode and cathode gas diffusion layers are employed adjacent their respective electrodes on either side of a catalyst coated membrane. The gas diffusion layers serve to uniformly distribute reactants to and remove by-products from the catalyst electrodes. Fuel and oxidant flow field plates are then typically provided adjacent their respective gas diffusion layers and the combination of all these components represents a typical individual fuel cell assembly. The flow field plates comprise flow fields that usually contain numerous fluid distribution channels. The flow field plates serve multiple functions including: distribution of reactants to the gas diffusion layers, removal of by-products therefrom, structural support and containment, and current collection. Often, the fuel and oxidant flow field plates are assembled into a unitary bipolar plate in order to incorporate a coolant flow field therebetween and/or for other assembly purposes. Because the output voltage of a single cell is of order of 1V, a plurality of such fuel cell assemblies is usually stacked together in series for commercial applications. Fuel cell stacks can be further connected in arrays of interconnected stacks in series and/or parallel for use in automotive applications and the like.

Numerous seals are therefore required in typical fuel cell stack construction, and achieving adequate, reliable seals in a manner suitable for commercial, high volume manufacture is challenging. Around the periphery of the catalyst coated membranes, pressurized fuel and oxidant gases must be separated from each other (i.e. gas shorting around the edges of the membrane must be prevented) and also prevented from leaking to the external environment. It is also commonplace that any additional components, if present, (e.g. seals, gaskets, frames) are used to seal fluid ports and to provide electrical isolation between surfaces at opposite electrode potentials. Problems with the sealing processes used to date are high cost, high parts count, complexity, long cycle times, yield risk to expensive components (e.g. catalyst coated membranes), and inability to scale up to high volume production.

Three main methods are currently used to seal working fluids at the edges of catalyst coated membranes: frames, elastomeric seals molded directly thereon, and adhesive sealing.

Conventional framed CCMs typically comprise two polymeric films that are bonded to and sandwich the CCM at the edge. The frame can then be used as a gasket for sealing purposes. Often the gas diffusion layers employed with such designs extend beyond the active area of the electrodes in order to mechanically assist in other peripheral seals. In these designs, elastomeric seals for external sealing of the fuel cell assembly may either be molded onto the bipolar plate or molded discretely and then preassembled to the bipolar plate. The polymeric films employed can be of two general types. The first type is a thermoplastic (e.g. polyethylene) which can itself be melted and laminated together. The second type is a polymer coated on one side with suitable adhesive (e.g. heat activated adhesive). This allows for the use of a base polymeric film with improved mechanical properties (e.g. PEN). Two such adhesive coated films can be laminated together adhesive side to adhesive side. Lamination of such polymeric films typically requires a thermal cycle either to fuse them together or to activate the adhesive. Because the typical catalyst coated membrane, frame and gas diffusion layer are thin and flexible, this manufacturing process can be problematic. Further, the CCMs can distort dimensionally under temperature and humidity changes. The tooling typically required for assembly comprises precisely machined steps to contact each thin layer of laminate in turn at the edge of the active area with precisely the right amount of bonding pressure. The tolerances are very tight since each component is quite thin and has its own tolerance (e.g. CCM, frame, and gas diffusion layers range from about 10-25 µm, 25-50 µm, and 150-200 µm in thickness respectively). In addition thermal isolation is sometimes needed between the heated laminated areas and the active area of the CCM. The active area may even require cooling during the lamination process. This complex assembly fixture must remain dimensionally stable within a few microns over thousands of thermal cycles. And unfortunately, most of the frame material is wasted as the active area window is cut from a continuous sheet to leave a border of only a few mm on the periphery.

Where elastomeric seals are molded directly onto the membrane electrode assemblies, a liquid injection molding press is typically used to produce silicone seals directly attached to a laminated membrane electrode assembly comprising a CCM and gas diffusion layers. The silicone saturates the edges of the gas diffusion layers and isolates the edge of the CCM from access to gases. The silicone seal is compressed against flat seal grooves on adjacent separator plate surfaces to seal the fluids externally. This also requires precise tooling, tailored to a given membrane electrode assembly, and so in turn requires stable structural/mechanical characteristics in the membrane electrode assemblies. Variations impact process stability and can be difficult to control given the nature of the random fibre materials in typical gas diffusion layers. In addition, the high pressure elastomer in the mold cavity can separate the unconstrained edge of the CCM from the gas diffusion layers, either resulting in several types of failures or requiring an additional gasket to bond the gas diffusion layers to the CCM. Molding is also a high capital cost and long cycle time and thus an undesirable operation.

In the adhesive sealing approach, two types of adhesives may be considered, namely thermally cured adhesives and ambient temperature cured adhesives. With the former, there are the same risks during assembly to the CCM as described in the aforementioned framing processes, thus requiring the same types of controls. With the latter, cure times are generally undesirably long in order to gain the necessary pot life to allow application to the components.

Another sealing requirement in typical solid polymer electrolyte fuel cells is in the transition regions existing between the reactant flow fields and the reactant ports in the flow field plates. Here again, the reactant fluid streams have to be properly separated. The seals for these regions also have to seal to the membrane electrolyte or CCM, and be stiff enough to resist bending forces arising from pressure differences between the reactants such that the seal does not occlude fluid flow in the transition region and thus affect performance. Generally, a trade-off must be made between stiffness and fuel cell thickness since thicker sealing components must be considered in order to obtain necessary stiffness. In prior art constructions, a design employing a framed CCM with an extended frame (extended over the transition regions) and extended gas diffusion layers can provide the necessary seals in the transition regions. The framed CCM provides the seal to the CCM while the gas diffusion layers provide the stiffness. Alternatively, an additional bridging component (e.g. metallic inlay, reinforced polymer material shim) may be included to provide additional stiffness. While such approaches can provide adequate sealing in the transition regions, they involve additional material and complexity.

Despite the advances made to date, there remains a need for greater simplification, reliability, and cost reduction in fuel cell assembly processes. This invention fulfills these needs and provides further related advantages.

SUMMARY

The present invention provides for simpler constructions and methods for manufacturing fuel cell assemblies for a solid polymer electrolyte fuel cell stack. The fuel cell assemblies employ catalyst coated membranes and a construction in which plastic film frames are used to frame the catalyst coated membranes within. Embodiments of the invention result in reduced parts count, more efficient use of component materials, and improved robustness in associated lamination processes.

In one embodiment, the plastic film frame is adhesive coated on one side and laminated at its inner edge to one surface of the catalyst coated membrane and at its outer edge to the flow field plate on the opposite side. Specifically, these fuel cell assemblies comprise a catalyst coated membrane having first and second surfaces and comprising a solid polymer electrolyte membrane electrolyte coated with cathode catalyst on a cathode side and with anode catalyst on an anode side, a cathode gas diffusion layer adjacent the cathode catalyst, an anode gas diffusion layer adjacent the anode catalyst, an oxidant flow field plate adjacent the cathode gas diffusion layer in which the oxidant flow field plate comprises an oxidant flow field on the side adjacent the cathode gas diffusion layer, a fuel flow field plate adjacent the anode gas diffusion layer in which the fuel flow field plate comprises a fuel flow field on the side adjacent the anode gas diffusion layer, a seal for sealing an oxidant flow field plate to a fuel flow field plate at an edge seal location, and the plastic film frame coated on at least one side with adhesive and framing the catalyst coated membrane. Additionally, the adhesive side of the inner edge of the plastic film frame is laminated to the first surface of the catalyst coated membrane, and the adhesive side of the outer edge of the plastic film frame is laminated to that one of the oxidant and fuel flow field plates facing the second surface of the catalyst coated membrane at the edge seal location. This construction allows a single layer of adhesive-backed frame material to separate the fuel cell electrodes at their edges. Also, the catalyst coated membrane can be laminated to a flat, stable flow field plate, thereby improving the robustness of the lamination process.

In the preceding embodiment, a layer of adhesive can be applied on the second surface of the catalyst coated membrane and on the adhesive side of the plastic film in the vicinity of the inner edge of the plastic film frame. In this way a more reliable fluid seal can be obtained. Alternatively, the solid polymer membrane electrolyte may be absent catalyst coating on the first surface in the vicinity of the inner edge of the plastic film frame. Then, the inner edge of the plastic film frame can be laminated directly to the solid polymer membrane electrolyte and achieve a more reliable fluid seal.

Although the plastic film frame may be laminated to either surface of the catalyst coated membrane, it may be preferred to do so to the cathode side. Thus here, the first surface of the catalyst coated membrane is the cathode side, the second surface is the anode side, and the fuel flow field plate faces the second surface. In this way, the area of the catalyst coated membrane exposed to fuel gas can be slightly larger than that exposed to cathode gas, thereby mitigating the risk of fuel-starvation related catalyst corrosion.

The seal for sealing the oxidant flow field plate to a fuel flow field plate at an edge seal location can be an elastomeric seal, such as a silicone elastomer. With such a selection and with the oxidant and fuel flow field plates bonded together into a unitary bipolar flow field plate, an elegant repeating unit can be manufactured for later assembly into a fuel cell stack.

In an alternative embodiment, the plastic film frame is coated on both sides with adhesive and the seal at the edge seal location can then be a laminated, non-elastomeric seal. With this selection, a complete, sealed fuel cell unit can be manufactured for later assembly into a fuel cell stack.

A suitable plastic film frame is polyethylene naphthalate. Polypropylene is another potential option. The adhesive employed can be a heat activated adhesive and thus the laminating steps can involve applying heat and applying pressure.

In these embodiments, the gas diffusion layer facing the second surface of the catalyst coated membrane can optionally extend beyond the edge of the catalyst coated membrane so as to also be laminated to the adhesive side of the plastic film frame between the inner edge and the outer edge. And, the gas diffusion layer facing the first surface of the catalyst coated membrane can optionally extend to the edge of the catalyst coated membrane and the inner edge of the plastic film frame can be located between the catalyst coated membrane and the gas diffusion layer facing the first surface.

In another advantageous embodiment, the plastic film frame is laminated to sealing features incorporated in a transition region in the flow field plate. Specifically, in these fuel cell assemblies, the side of the flow field plate facing the second surface of the catalyst coated membrane comprises a transition region adjacent the flow field, and the transition region comprises sealing features. The cathode and anode gas diffusion layers can extend to the edge of the catalyst coated membrane. The plastic film frame between the inner edge and the outer edge is laminated to the sealing features in and around the transition region.

The aforementioned embodiments can be manufactured by laminating the adhesive side of the inner edge of the plastic film frame to the first surface of the catalyst coated membrane, thereby framing the catalyst coated membrane, and by laminating the adhesive side of the outer edge of the plastic film frame to that one of the oxidant and fuel flow field plates facing the second surface of the catalyst coated membrane at the edge seal location.

In relevant embodiments, a layer of adhesive can be applied on the second surface of the catalyst coated membrane and the adhesive side of the plastic film in the vicinity of the inner edge of the plastic film frame by applying an adhesive coated backing film to the second surface of the catalyst coated membrane and to the adhesive side of the plastic film in the vicinity of the inner edge of the plastic film frame, and then removing the backing film.

In relevant embodiments, the inner edge of the plastic film frame can be laminated directly to the solid polymer membrane electrolyte. In embodiments in which the gas diffusion layer facing the second surface of the catalyst coated membrane extends beyond the edge of the catalyst coated membrane, this gas diffusion layer can also be laminated to the adhesive side of the plastic film frame between the inner edge and the outer edge during the laminating of the adhesive side of the inner edge of the plastic film frame to the first surface of the catalyst coated membrane.

When elastomeric seals are employed, fuel cell stacks can be manufactured by stacking the fuel cell assemblies into a series stack, and compressing the elastomeric seals between the oxidant and flow field plates, thereby sealing the fuel cell assemblies.

When the plastic film frame is coated on both sides with adhesive, and non-elastomeric seals are employed, fuel cell stacks can be manufactured by bonding the oxidant and fuel flow field plates together into a unitary bipolar flow field plate, stacking the fuel cell assemblies into a series stack, and laminating the non-elastomeric seals to adjacent oxidant and flow field plates, thereby sealing the fuel cell assemblies. Alternatively, fuel cell stacks can be manufactured by preparing a plurality of fuel cell subassemblies by laminating the gas diffusion layer facing the second surface of the catalyst coated membrane to the adhesive side of the plastic film frame, thereby creating a laminated subassembly (comprising the catalyst coated membrane, the plastic film frame, the gas diffusion layer facing the second surface of the catalyst coated membrane and the flow field plate facing the second surface of the catalyst coated membrane), laminating the gas diffusion layer facing the first surface of the catalyst coated membrane to the subassembly, laminating that one of the oxidant and fuel flow field plates facing the first surface of the catalyst coated membrane to the subassembly, and laminating the non-elastomeric seal to the oxidant and flow field plates, thereby sealing the fuel cell assemblies. Then the stack is manufactured by stacking the fuel cell assemblies into a series stack, and bonding together each oxidant flow field plate adjacent to a fuel flow field plate.

In another embodiment of the invention, a plastic film frame frames the catalyst coated membrane in each fuel cell assembly and at least one of the flow field plates comprises a transition region adjacent the flow field. The transition region comprises sealing features, and the plastic film frame is laminated to the sealing features of the transition region. Such fuel cell assemblies can be prepared by coating the plastic film frame on at least one side with adhesive, and laminating the adhesive side of the plastic film frame to the sealing features of the transition region. In such an embodiment, a thinner plastic frame can now provide the fluid separation function in the transition regions instead of thicker gas diffusion layers thus reducing cell thickness and wasted diffusion layer material. And as in previously mentioned embodiments, the catalyst coated membrane is laminated to a flat, stable flow field plate, thereby improving the robustness of the lamination process. These embodiments which seal the transition region can be used independent of or alternatively in combination with embodiments which separate the fuel cell electrodes at their edge with a single layer of adhesive-backed frame material. The latter are particularly useful for enabling the former.

These and other aspects of the invention are evident upon reference to the attached Figures and following detailed description.

BRIEF DESCRIPTION OF THE DRAWINGS

FIG. 1a shows a schematic cross-sectional view of a fuel cell assembly comprising a single plastic film frame with adhesive on one side and laminated to the cathode side of the CCM and to the anode flow field plate. Also in this assembly, the anode gas diffusion layer extends beyond the CCM and an elastomeric seal is employed.

FIG. 1b shows a schematic cross-sectional view of a fuel cell assembly like that of FIG. 1a except that the inner edge of the plastic film frame is laminated directly to the solid polymer membrane electrolyte.

DETAILED DESCRIPTION

Figure 2:
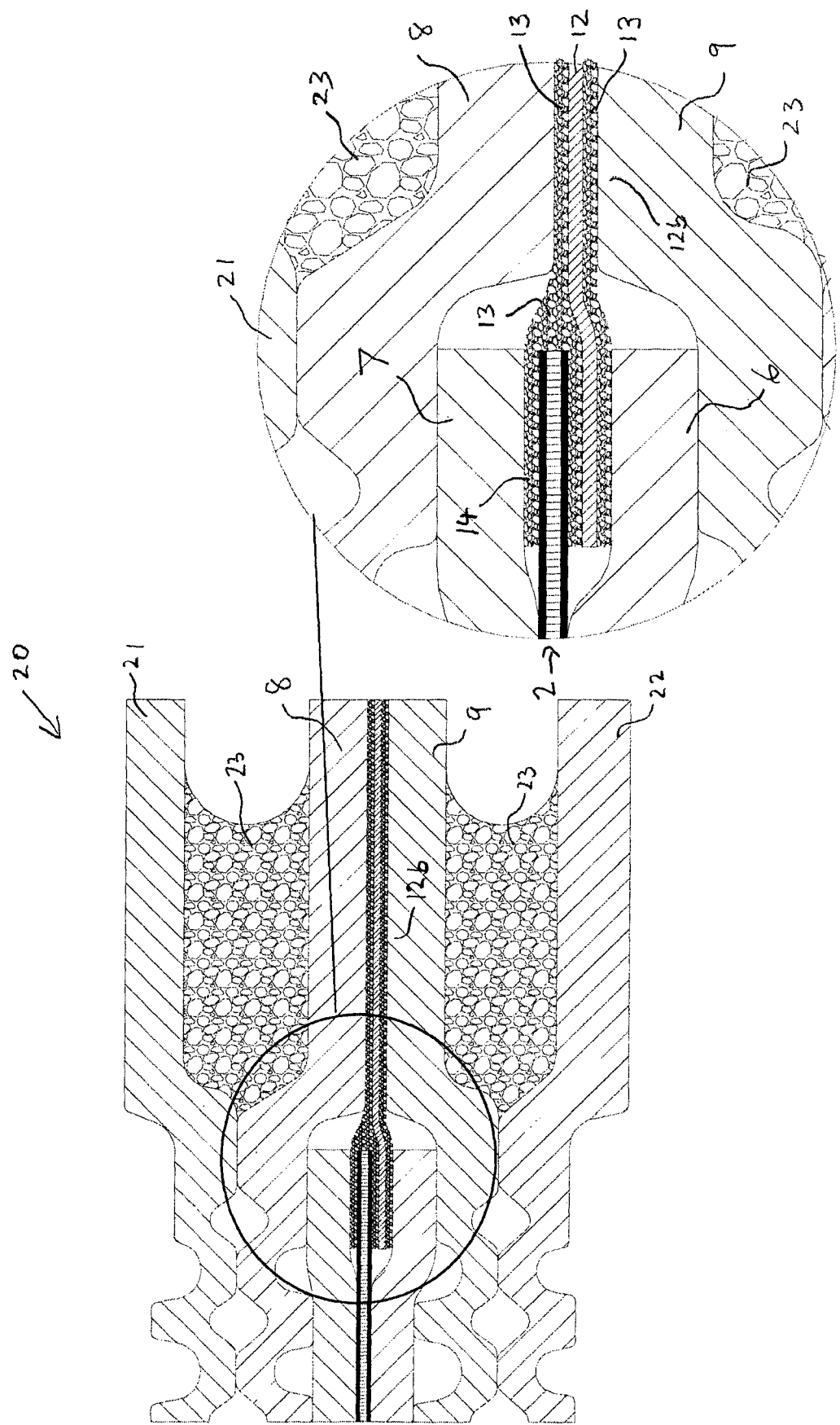
FIG. 2 shows a schematic cross-sectional view of a fuel cell assembly like that of FIG. 1a except the anode gas diffusion layer extends to the edge of the CCM, the plastic film frame has adhesive on both sides, and a non-elastomeric seal is employed.

Herein, the following definitions have been used. In a quantitative context, the term "about" should be construed as being in the range up to plus 10% and down to minus 10%.

"Laminating" refers to bonding or unifying of at least two sheet-like components and a "laminate" is the associated product.

The term "transition region" is used herein with reference to a region in between the channels in the reactant flow fields and the reactant ports in a fuel cell flow field plate. In this region, fluid flow transitions from a single, large body of flow into a multiplicity of small channel flow streams. A transition region generally comprises features in order to appropriately transition the flow of reactants and by-products between the distributed flow required in the flow fields and the bulk flow occurring at the ports. The transition region is generally not considered as an electrochemically active part of the fuel cell.

A schematic cross-sectional view of an exemplary embodiment of the invention is shown in FIG. 1a. A magnified view near the edge of the CCM is also provided to aid in resolving the smaller components involved. Here, fuel cell assembly 1 includes CCM 2 which comprises solid polymer electrolyte 3 with cathode 4 and anode 5 coated on opposite surfaces of electrolyte 3. Cathode gas diffusion layer 6 and anode gas diffusion layer 7 are located adjacent cathode 4 and anode 5 respectively. Fuel cell assembly 1 also includes a bipolar flow field plate assembly comprising fuel flow field plate 8 and oxidant flow field plate 9 which have been bonded together into a unitary assembly. Elastomeric seal 10 appears at the edge of fuel cell assembly 1 for sealing fuel flow field plate 8, at edge location 10a, to a neighboring fuel flow field plate (not shown) in a fuel cell stack comprising a series stack of similar fuel cell assemblies. In the embodiment of FIG. 1a, a single plastic film frame 12 with adhesive 13 on one side is laminated at its inner edge 12a to the cathode side of CCM 2 and at its outer edge 12b to fuel flow field plate 8. In FIG. 1a, section 7a of anode gas diffusion layer 7 extends beyond the edge of CCM 2 and plastic film frame 12 is also laminated to section 7a.

Although it is possible to obtain adequate seals at the edge of CCM 2 without any additional adhesive, in the preferred embodiment of FIG. 1, additional adhesive layer 14 is applied on the anode surface of CCM 2 and on the adhesive side of plastic film frame 12 in the vicinity of its inner edge 12a. The combination of additional adhesive layer 14 and adhesive backed plastic film frame 12 essentially encapsulates the edge of CCM 2 for a more robust seal.

FIG. 1b shows an alternative embodiment to that shown in FIG. 1a. Again, a magnified view near the edge of the CCM is also provided. In FIG. 1b, the same numerals from FIG. 1a have been used to indicate common components. Fuel cell assembly 15 here is of similar construction but electrolyte 3 is absent catalyst coating on both surfaces in the vicinity of inner edge 12a of plastic film frame 12 (i.e. is absent cathode 4 and anode 5 at the edge of electrolyte 3). In this embodiment, plastic film frame 12 is laminated directly to electrolyte 3.

FIG. 2 shows a further embodiment of the invention in which adhesive is used on both sides of the plastic film frame. This allows for a non-elastomeric seal to be used in the assembly. Again, a magnified view near the edge of the CCM is also provided. As before, the same numerals from FIG. 1a have been used to indicate common components. Fuel cell assembly 20 here however employs adhesive 13 on both sides of plastic film frame 12 which is then used to seal directly to adjacent fuel flow plate 8 and adjacent oxidant flow field plate 9 at outer edge 12b. The combination of adhesive 13 and outer edge 12b of the plastic film frame serves as an incompressible non-elastomeric edge seal for the fuel cell. In an alternative embodiment (not shown), a non-elastomeric gasket or spacer may be employed between one or both of fuel and oxidant flow field plates 8, 9 and the outer edge 12b of adhesive coated plastic film frame. In this alternative embodiment, the combination of the gasket, adhesive 13, and outer edge 12b of the plastic film frame serves as a non-elastomeric edge seal for the fuel cell.

Fuel cell assembly 20 in FIG. 2 is thus a completely sealed unit fuel cell, but does not include a pre-assembled unitary bipolar plate. Instead, adjacent fuel and oxidant flow field plates are bonded together during later assembly of a fuel cell stack. For instance, FIG. 2 shows how oxidant flow field plate 21 and fuel flow field plate 22 from the two neighboring fuel cells in a fuel cell stack could be bonded via adhesive 23 to fuel flow field plate 8 and oxidant flow field plate 9 respectively.

The embodiment in FIG. 2 also shows an alternative arrangement in the vicinity of the inner edge 12a of the plastic film frame. Here, both anode gas diffusion layer 7 and cathode gas diffusion layer 6 extend just to the edge of CCM 2.

Figure 3:
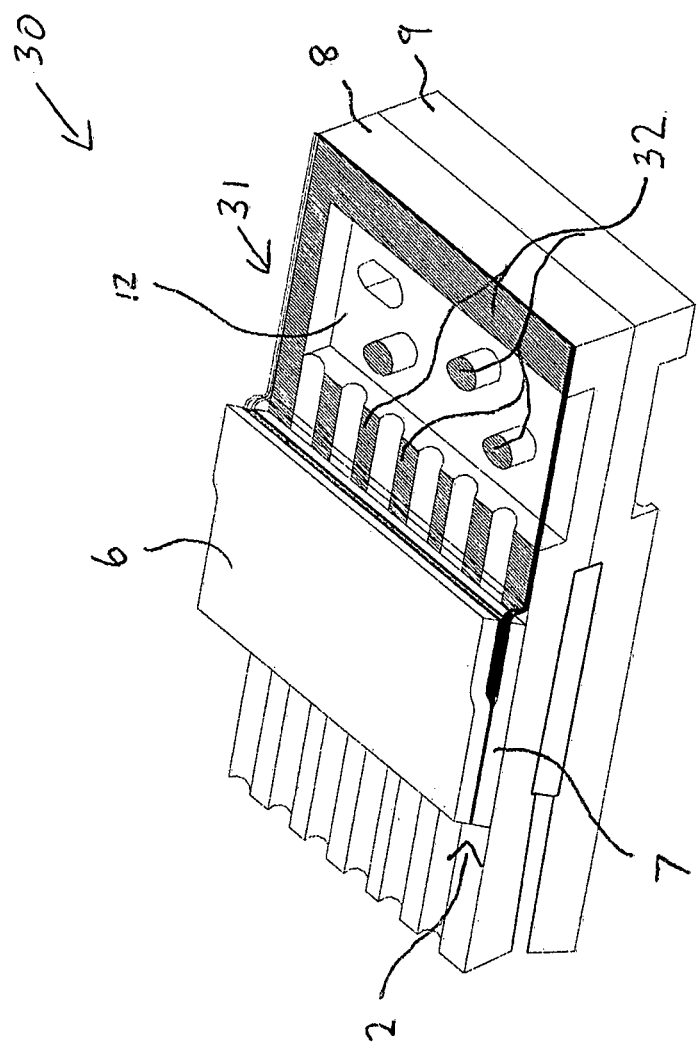
FIG. 3 shows an isometric view of a fuel cell assembly like that of FIG. 1a except that the plastic film frame is laminated to sealing features in the transition region.

In the preceding figures, the sealing configurations in the transition regions of the flow field plates can be made in a variety of conventional ways and are not shown. FIG. 3 shows an isometric view of an advantageous embodiment of the invention in which the plastic film frame is laminated to sealing features in the transition region of fuel flow field plate 8. Fuel cell assembly 30 here is similar in construction to fuel cell assembly 1 in FIG. 1a in the vicinity of CCM 2. And again, the same numerals have been used to indicate common components. However here, seals are obtained in transition region 31 by laminating extended plastic film frame 12 to various sealing features 32. (In FIG. 3, plastic film frame 12 is shown as transparent in transition region 31 in order to view underlying structure. The areas where plastic film frame 12 has been laminated to sealing features 32 have however been shown in cross-hatch.) These sealing features 32 typically appear around and in transition region 31 and are essentially landings to which adhesive backed plastic film frame 12 would bond. Such features typically support the membrane electrode assemblies against the differential fluid pressures forcing them towards the floor of the flow field plates.

Figure 4:
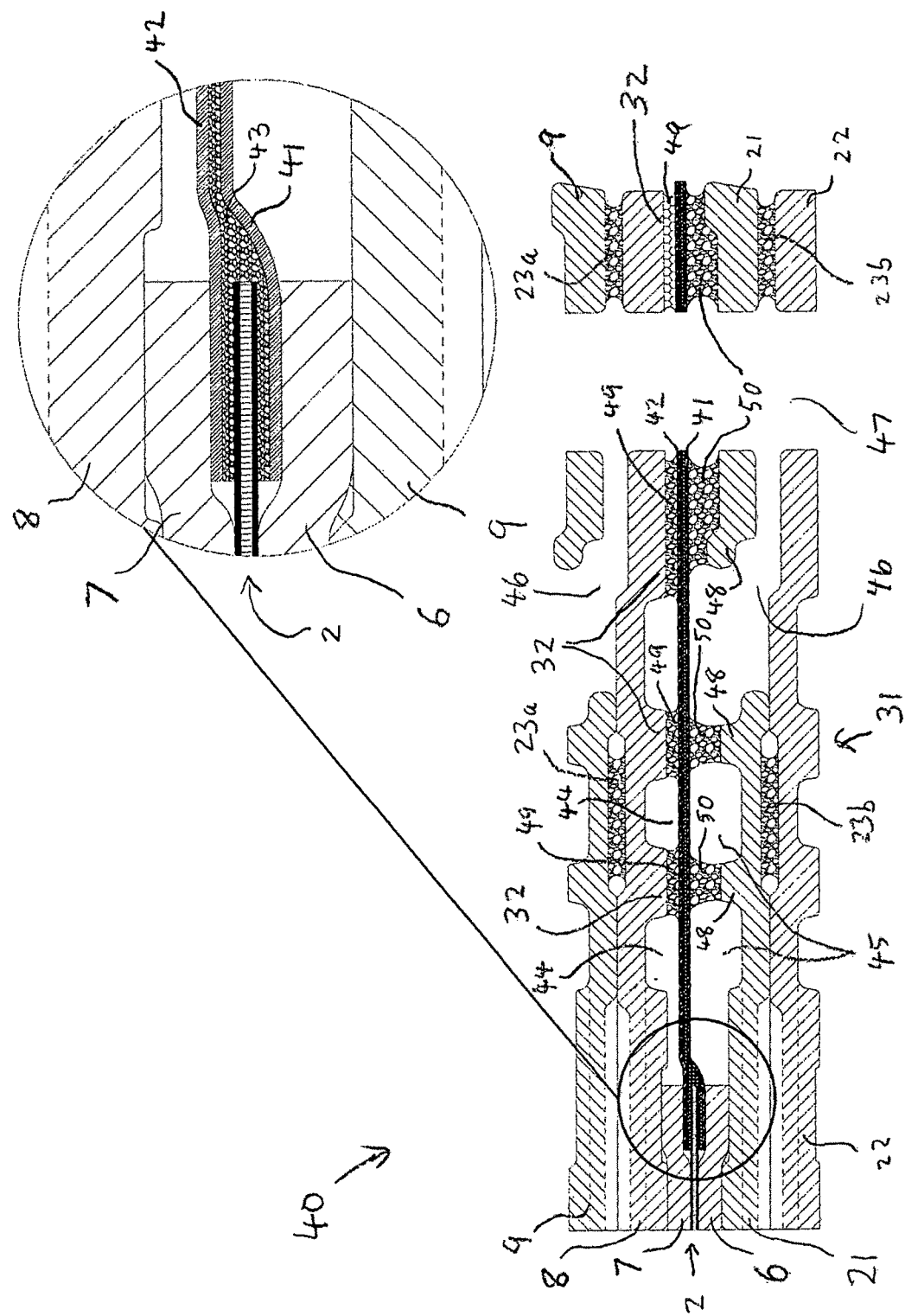
FIG. 4 shows a schematic cross-sectional view of a fuel cell assembly like that of FIG. 3 except that a conventional plastic film frame construction is employed on both sides of the CCM.

FIG. 4 shows a further embodiment of the invention in which the sealing configuration in the transition regions shown in FIG. 3 is employed in an otherwise prior art fuel cell construction. A magnified view near the edge of the CCM is again provided too. FIG. 4 shows a schematic cross-sectional view of fuel cell assembly 40 in which a conventional plastic film frame construction is employed on both sides of CCM 2. (Cell assembly 40 is quite similar to the embodiment shown in FIG. 1 but for the conventional plastic film frame construction. Again, the same numerals have been used to indicate common components. Here however, fuel flow field plate 8 and oxidant flow field plate 9 are shown bonded together using adhesive 23a.) The conventional plastic film frame construction employs two separate plastic film frames 41, 42 which sandwich and seal to the edge of CCM 2 and provide separation between the fuel and oxidant sides of the fuel cell. As shown, plastic film frames 41, 42 are bonded together where they meet using adhesive coatings 43. (In alternative conventional embodiments, plastic film frames 41, 42 may be melt-bonded together without using additional adhesive.) As shown, transition region 31 comprises fuel transition regions 44, oxidant transition regions 45, and backfeed slots 46 for oxidant which fluidly connect to oxidant port 47.

As in FIG. 3, seals are obtained in transition region 31 by laminating plastic film frames 41, 42 to various sealing features 32. To accomplish this, adhesive 49 is first coated or otherwise applied to sealing features 32 after which plastic film frames 41, 42 are laminated thereto. Fuel cell stacks can then readily be prepared by appropriately stacking and bonding a plurality of fuel cell assemblies 40 together. FIG. 4 shows the bipolar plate from a neighboring such fuel cell assembly comprising oxidant flow field plate 21 and fuel flow field plate 22 which have already been bonded together via adhesive 23b. The neighboring fuel cell assembly has its own sealing features 48 on oxidant flow field plate 21 that are complementary to sealing features 32. And thus sealing bonds are created by first coating or applying adhesive 50 to sealing features 48 and thereafter aligning and laminating the neighboring fuel cell assembly to fuel cell assembly 40. (Instead of employing adhesive-based seals with adhesive 50, elastomeric seals may be considered instead. However, the tensile strength specification of the plastic film frame may need to be significantly higher to withstand the seal's reaction forces over any open spans. On the other hand, there is an absence of pressure exerted by use of adhesive 50, and thus such adhesive-based seals may be preferred.)

By sealing the plastic film frames to sealing features in the transition region (for instance as shown in FIGS. 3 and 4), the film frames are held in tension over the reactant fluid cavities. The fluid pressure loading acts on the film bringing it into tension (thus ideally suiting the film's materials properties), which is converted to shear loading in the laminated adhesive joints with the plates (thus ideally suiting the adhesive's material properties).

In the preceding embodiments, the plastic film frames can be made of any polymeric material suitable for use in the fuel cell environment and having acceptable mechanical properties. Polyethylene naphthalate is particularly suitable. The adhesive backings can comprise various adhesives for this purpose, such as commercially available Sheldahl A438, and be of order of 25-50 microns thick. Material overlaps for sealing purposes can generally be of order of 1-3 mm in dimension.

In general, where adhesive application is indicated, adhesive can optionally be coated in discrete patterns (e.g. using a screen or inkjet) or alternatively can be applied continuously via roller coating. For instance, where possible, any component areas to be bonded might incorporate upstanding landings (such as sealing features 32 on fuel flow field plate 8 in FIGS. 3 and 4). When such a component is passed through a roller coater, adhesive would be deposited continuously and uniformly on these upstanding landings.

The preceding designs and methods of assembly offer many potential advantages. These include a reduced parts count (e.g. one layer of frame and potentially one molded elastomeric seal might be eliminated). The robustness of the lamination process is itself improved by laminating the CCMs to flat, stable plate surfaces rather than to a flexible film. Alignment and positioning into a lamination fixture can be made more accurate.

Further, there is a potential for a reduction in fuel cell thickness. The overall thickness needed to accomplish fluid sealing and reactant fluids pressure loading is lower. For instance, in the seal area near the CCM edge, one layer of adhesive coated polyethylene napthalate may replace two gas diffusion layers and one layer of CCM, thereby saving up to approximately 300 microns in thickness based on state of the art component thicknesses.

Additional potential advantages include reductions in the amount of molding equipment required, in the overall cycle time required to effect cell sealing, and in cost (through elimination of gas diffusion layer material or additional bridge components in the seal area near the CCM edge).

The following examples are illustrative of the invention but should not be construed as limiting in any way.

EXAMPLES

A laboratory size experimental fuel cell assembly was made using conventional components for solid polymer electrolyte fuel cells, i.e. CCM comprising carbon supported platinum catalyst on a perfluorosulfonated ionomer membrane electrolyte, carbon fibre gas diffusion layers comprising carbon particle based sublayers, and fuel and oxidant flow field plates made of graphite/resin composite material. However, the fuel cell assembly was made in accordance with the invention using a single adhesive coated plastic film frame to provide seals at the edge of the CCM. The plastic used was polyethylene naphthalate and the adhesive was Sheldahl A438. The assembly was made as illustrated in FIG. 1a except without using any additional adhesive layer 14 applied on the anode surface near the edge of the CCM.

The experimental fuel cell assembly was then tested under typical reactant pressure and temperature operating conditions. While the edge seals at the CCM were initially acceptable, the assembly suffered an early failure over time due to gas and electrical shorting around the edge of the CCM.

The preceding test was repeated with another experimental fuel assembly, except this time an additional adhesive layer was applied (like additional adhesive layer 14 in FIG. 1a). This experimental fuel cell assembly was tested under the same operating conditions as before. This time, the fuel cell assembly did not suffer an early failure due to gas and electrical shorting around the edge of the CCM.

The preceding test was repeated again with a commercial size experimental fuel assembly this time (e.g. sized for automotive applications) while again using an additional adhesive layer applied on the anode surface near the edge of the CCM. In addition, the plastic film frame was laminated to sealing features in the transition region of the fuel flow field plate as shown in FIG. 3. This larger experimental fuel cell assembly was tested under the same operating conditions as before. And as before, the fuel cell assembly did not suffer any early failure on testing.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A fuel cell assembly for a solid polymer electrolyte fuel cell stack in which a plurality of fuel cell assemblies are stacked in series, comprising:

a catalyst coated membrane having first and second surfaces and comprising a solid polymer membrane electrolyte coated with cathode catalyst on a cathode side and with anode catalyst on an anode side;

a cathode gas diffusion layer adjacent the cathode catalyst;

an anode gas diffusion layer adjacent the anode catalyst;

an oxidant flow field plate having at least one flat surface and a fuel flow field plate having at least one flat surface, the oxidant flow field plate and fuel flow field plate adhesively bonded together into a unitary assembly, wherein either (a) the oxidant flow field plate is adjacent the cathode gas diffusion layer or (b) the fuel flow field plate is adjacent the anode gas diffusion layer, and wherein a seal is provided sealing the oxidant flow field plate to the fuel flow field plate of the unitary assembly at an edge seal location;

a single plastic film frame having a first major surface and a second major surface, an inner edge overlapping the catalyst coated membrane and a peripheral edge, the single plastic film frame cut from a continuous sheet and coated on at least one major surface with adhesive and framing the catalyst coated membrane, wherein the adhesive at least one major surface at the inner edge of the plastic film frame is laminated to the first surface of the catalyst coated membrane, and wherein the adhesive at least one major surface at the peripheral edge of the plastic film frame is laminated to the at least one flat surface of that one of the oxidant and fuel flow field plates facing the second surface of the catalyst coated membrane.

2. The fuel cell assembly of claim 1 wherein the solid polymer membrane electrolyte is absent catalyst coating on the first surface in the vicinity of the inner edge of the plastic film frame and the inner edge of the plastic film frame is laminated directly to the solid polymer membrane electrolyte.

3. The fuel cell assembly of claim 1 wherein the first surface of the catalyst coated membrane is the cathode side, the second surface is the anode side, and the fuel flow field plate faces the second surface.

4. The fuel cell assembly of claim 1 wherein the seal for sealing an oxidant flow field plate to a fuel flow field plate at an edge seal location is an elastomeric seal.

5. The fuel cell assembly of claim 4 wherein the elastomer is silicone.

6. The fuel cell assembly of claim 1 wherein the plastic film frame is coated on both sides with adhesive and the seal at the edge seal location is a laminated, non-elastomeric seal.

7. The fuel cell assembly of claim 1 wherein the plastic film frame comprises polyethylene naphthalate.

8. The fuel cell assembly of claim 1 wherein the adhesive is a heat activated adhesive.

9. The fuel cell assembly of claim 1 wherein the gas diffusion layer facing the second surface of the catalyst coated membrane extends beyond the edge of the catalyst coated membrane and is also laminated to the adhesive side of the plastic film frame between the inner edge and the peripheral edge.

10. The fuel cell assembly of claim 9 wherein the gas diffusion layer facing the first surface of the catalyst coated membrane extends to the edge of the catalyst coated membrane and the inner edge of the plastic film frame is located between the catalyst coated membrane and the gas diffusion layer facing the first surface.

11. The fuel cell assembly of claim 1 wherein the side of the flow field plate facing the second surface of the catalyst coated membrane comprises a transition region adjacent the flow field, and the transition region comprises sealing features.

12. The fuel cell assembly of claim 11 wherein the cathode and anode gas diffusion layers extend to the edge of the catalyst coated membrane and the plastic film frame between the inner edge and the peripheral edge is laminated to the sealing features of the transition region.

13. The fuel cell assembly of claim 1 wherein the oxidant and fuel flow field plates are bonded together into a unitary bipolar flow field plate.

14. A solid polymer electrolyte fuel cell stack comprising a series stack of a plurality of the fuel cell assemblies of claim 1.

15. A fuel cell assembly for a solid polymer electrolyte fuel cell stack in which a plurality of fuel cell assemblies are stacked in series, comprising:
   a catalyst coated membrane having first and second surfaces and comprising a solid polymer membrane electrolyte coated with cathode catalyst on a cathode side and with anode catalyst on an anode side;
   a cathode gas diffusion layer adjacent the cathode catalyst;
   an anode gas diffusion layer adjacent the anode catalyst;
   an oxidant flow field plate having at least one flat surface and a fuel flow field plate having at least one flat surface, the oxidant flow field plate and fuel flow field plate adhesively bonded together into a unitary assembly, wherein either (a) the oxidant flow field plate is adjacent the cathode gas diffusion layer or (b) the fuel flow field plate is adjacent the anode gas diffusion layer, and wherein a seal is provided sealing the oxidant flow field plate to the fuel flow field plate of the unitary assembly at an edge seal location;
   a single plastic film frame having a first major surface and a second major surface, an inner edge overlapping the catalyst coated membrane and a peripheral edge, the single plastic film frame cut from a continuous sheet and coated on at least one major surface with adhesive and framing the catalyst coated membrane, wherein the adhesive at least one major surface at the inner edge of the plastic film frame is laminated to the first surface of the catalyst coated membrane, and wherein the adhesive at least one major surface at the peripheral edge of the plastic film frame is laminated to the at least one flat surface of that one of the oxidant and fuel flow field plates facing the second surface of the catalyst coated membrane at the edge seal location; and
   a layer of adhesive applied on the second surface of the catalyst coated membrane and on the adhesive side of the plastic film in the vicinity of the inner edge of the plastic film frame.

* * * * *